United States Patent [19]

Kageyama et al.

[11] Patent Number: 5,658,683
[45] Date of Patent: Aug. 19, 1997

[54] METHOD FOR MAKING A CELL

[75] Inventors: Masayuki Kageyama; Noboru Hoshina, both of Fukushima, Japan

[73] Assignee: Sony Corporation, Tokyo, Japan

[21] Appl. No.: 573,364

[22] Filed: Dec. 15, 1995

[30] Foreign Application Priority Data

Dec. 19, 1994 [JP] Japan .................................. 6-314635

[51] Int. Cl.$^6$ ...................................................... H01M 4/04
[52] U.S. Cl. ............................ 429/94; 429/194; 29/623.1
[58] Field of Search ...................... 429/94, 194; 29/623.1

[56] References Cited

U.S. PATENT DOCUMENTS

| 418,483 | 12/1889 | Woolf | 429/94 |
|---|---|---|---|
| 3,377,201 | 4/1968 | Wagner et al. | 429/94 |
| 5,344,724 | 9/1994 | Ozaki et al. | 429/94 |
| 5,434,017 | 7/1995 | Berkowitz et al. | 429/94 |
| 5,439,760 | 8/1995 | Howard et al. | 429/196 |
| 5,443,925 | 8/1995 | Machida et al. | 429/194 |

*Primary Examiner*—Prince Willis, Jr.
*Assistant Examiner*—Carol Chaney
*Attorney, Agent, or Firm*—Hill, Steadman & Simpson

[57] ABSTRACT

A cell comprising a casing, a roll electrode element accommodated in said casing, and an electrolyte filled into the casing, the roll electrode element being composed of at least one sheet-like positive electrode, at least one sheet-like negative electrode and at least one film separator which are arranged alternately in an overlapped relation to each other such that the sheet-like positive electrode is brought into contact with the sheet-like negative electrode through the separator film, to form an electrode laminate, wherein the electrode laminate is wound around a core having an approximately rhombic shape in section to form a roll having a multi-layered structure and, after removal of the core, the roll of the electrode laminate is compressed to obtain the roll electrode element having an ellipsoidal shape in section.

4 Claims, 8 Drawing Sheets

EXAMPLE 2

METHOD FOR MAKING A CELL

BACKGROUND OF THE INVENTION

1. Field of the Invention

This invention relates to a cell in which a roll electrode element is accommodated, and more particularly to the roll electrode element produced by winding an electrode laminate around a core having an approximately rhombic shape in section, in which the respective electrodes of the electrode element are effectively prevented from being dislocated upon winding whereby fluctuation of the discharge capacity of the cell is considerably prohibited.

2. Prior Art

Recently, accompanying with a remarkable progress of the electronics techniques, reduction in size and weight of electronic equipments has been realized successively. Under these circumstances, there is an increased demand that a cell serving as a power source of the portable electronic equipments also has a reduced size, a reduced weight and a high energy density.

Hitherto, a secondary cell generally used has been predominantly of an aqueous electrolyte type such as a lead battery, nickel-cadmium battery, or the like. However, these cells of such an aqueous electrolyte type are unsatisfactory with respect to a degree of reduction of its weight and increase in its energy density though it shows a high cycle characteristic.

On the other hand, intense study and investigation have been recently made to develop a non-aqueous electrolyte type secondary cell in which a material capable of dope or undope of a lithium ion, such as lithium, a lithium alloy or a carbonaceous material is used as a negative electrode and a lithium-containing composite oxide such as lithium-cobalt composite oxide is used as a positive electrode. Since the non-aqueous electrolyte type secondary cell advantageously has not only a high energy density but also a low self-discharge and a reduced weight, an increased attention has been paid to the production of such a cell.

Meanwhile, in the field of the electronic equipments mentioned above, in association with continuous reduction in size and weight thereof, it is required to achieve a rectangular box-shaped cell having a thin thickness from a standpoint of saving a space in the electronic equipment.

In the case of such a rectangular box-shaped cell, there has been generally used a laminate-type electrode element composed of a plurality of strip-like positive electrodes, a plurality of strip-like negative electrodes and separator films interposed between the positive and negative electrodes, which are arranged alternately in an overlapped relation to each other. However, it is difficult to optimize a thickness of such a laminate-type electrode element.

For example, if each of the strip-like positive and negative electrodes has a relatively large thickness, the number of the strip-like positive and negative electrodes used for the production of the laminate-type electrode element must be limited to permit the laminate-type, electrode to be received within a casing of the cell. In this case, although it is easy to handle the laminate-type electrode element due to its simplified construction, the laminate-type electrode element has a small surface area serving for an electrode reaction between the positive and negative electrodes so that its heavy-load characteristic becomes unsatisfactory and rapid charging is not applicable thereto.

On the other hand, if the strip-like positive and negative electrodes have a small thickness, the number of the strip-like positive and negative electrodes used for the production of the laminate-type electrode element can be increased. However, in this case, since a construction of the laminate-type electrode element becomes complicated so that it is difficult to handle the laminate-type electrode element.

Under these circumstances, there has been proposed a roll electrode element composed of an elongated sheet-like positive electrode and an elongated sheet-like negative electrode and separator films. The sheet-like positive electrode, the sheet-like negative electrode and the separator films are arranged alternately in an overlapped relation to each other to form a electrode laminate which is then wound into a roll to obtain a roll electrode element. Such a roll electrode element has a multi-layered structure when viewed in cross-section thereof so that a large surface area for an electrode reaction between the positive electrode and the negative electrode is assured. In addition, only one sheet of each of the positive and negative electrodes is required to produce the roll electrode element, which achieves an considerably simplified construction of the electrode element.

However, if it is intended to apply such a roll electrode element to a rectangular box-shaped cell, the following problems are caused. That is, the roll electrode element is generally produced by winding the above-mentioned electrode laminate around a core having a circular or ellipsoidal shape in section to form a multi-layered roll. After completion of the winding around the core, the core is removed from the roll electrode element. Thereafter, the roll electrode element is required to be compressed in the diametrical direction thereof to thereby deform it into an ellipsoidal shape in section, such that the roll electrode element can be accommodated within a casing of the rectangular box-shaped cell.

However, in the case where the core having a circular or ellipsoidal shape in section is used for forming the roll electrode element, looseness is caused between the respective electrodes, particularly at inner peripheral portions in the proximity of folded portions of the roll, so that a clearance is created between the positive and negative electrodes. As a result, a uniform electrode reaction between the positive and negative electrodes cannot be maintained, which leads to undesirable deterioration or fluctuation of the discharge capacity of the cell.

In order to overcome the above-mentioned deficiencies, several proposals have been conventionally made. For example, Japanese patent laid-open publication No. 98,801/94 discloses an electrode element which is produced by winding an electrode laminate around a core having a flat-plate shape. However, since the flat plate-shaped core has a unsatisfactory mechanical strength (hardness), an undesirable dislocation is caused between the positive and negative electrodes upon winding. Namely, the sheet-like negative electrode is projected from the sheet-like positive electrode in the direction of the width thereof so that a portion of the positive electrode remains uncovered with the negative electrode. Such an uncovered portion generated in the roll electrode element, causes deterioration of the discharge capacity of the cell, as disclosed in Japanese utility model laid-open publication No. 150,760/90.

OBJECT AND SUMMARY OF THE INVENTION

It is therefore an object of the present invention to provide a method for making a cell which accommodates a roll electrode element produced without winding looseness, whereby the cell exhibiting a uniform discharge capacity as well as a excellent heavy-load characteristic and a high reliability can be produced.

In accordance with the present invention, there is provided a cell comprising a casing, a roll electrode element accommodated in the casing, an electrolyte filled into the casing, the roll electrode element being composed of at least one sheet-like positive electrode, at least one sheet-like negative electrode and at least one separator film which are arranged alternately in an overlapped relation to each other such that the sheet-like positive electrode is brought into contact with the sheet-like negative electrode through the separator film, to form an electrode laminate, wherein the electrode laminate is wound around a core having an approximately rhombic shape in section to form a roll having a multi-layered structure and, after removal of the core from the roll, the roll is compressed to obtain said roll electrode element having an ellipsoidal shape in section.

A feature of the present invention resides in that, in order to provide a simplified structure of the cell particularly the non-aqueous electrolyte type cell, and assure a sufficient surface area for the electrode reaction between the positive and negative electrodes, at least one sheet-like negative electrode, at least one sheet-like positive electrode and at least one separator film are arranged alternately in an overlapped relation to each other such that the sheet-like positive electrode is brought into contact with the sheet-like negative electrode through the separator film. The resulting electrode laminate is then wound around a core to obtain a roll electrode element having a multi-layered structure. Especially, according to the present invention, the core used upon winding the electrode laminate is of an approximately rhombic shape in section to thereby obtain the roll electrode element without occurrence of winding looseness and winding dislocation of the rolled electrodes.

The core having an approximately rhombic shape in section has a high mechanical strength and does not suffer from deformation during winding of the electrode laminate so that the roll electrode element can be obtained without the dislocation of the respective electrodes. Further, since the core of the approximately rhombic shape is provided with opposite acute angle corners, portions of the electrode laminate is surely folded and reformed when it is wound along such corners of the core. Consequently, after the core is removed and the rolled electrode laminate is compressed, the rolled electrode laminate is smoothly deformed along the reformed folded portions thereof so that the roll electrode element having an ellipsoidal shape in section can be produced without looseness of the electrodes but with a uniform and large discharge capacity.

Further and other objects, advantages and features of the present invention will become more apparent from the following detailed description by referring to the accompanying drawings.

DETAILED DESCRIPTION OF THE INVENTION

Figure 1A:
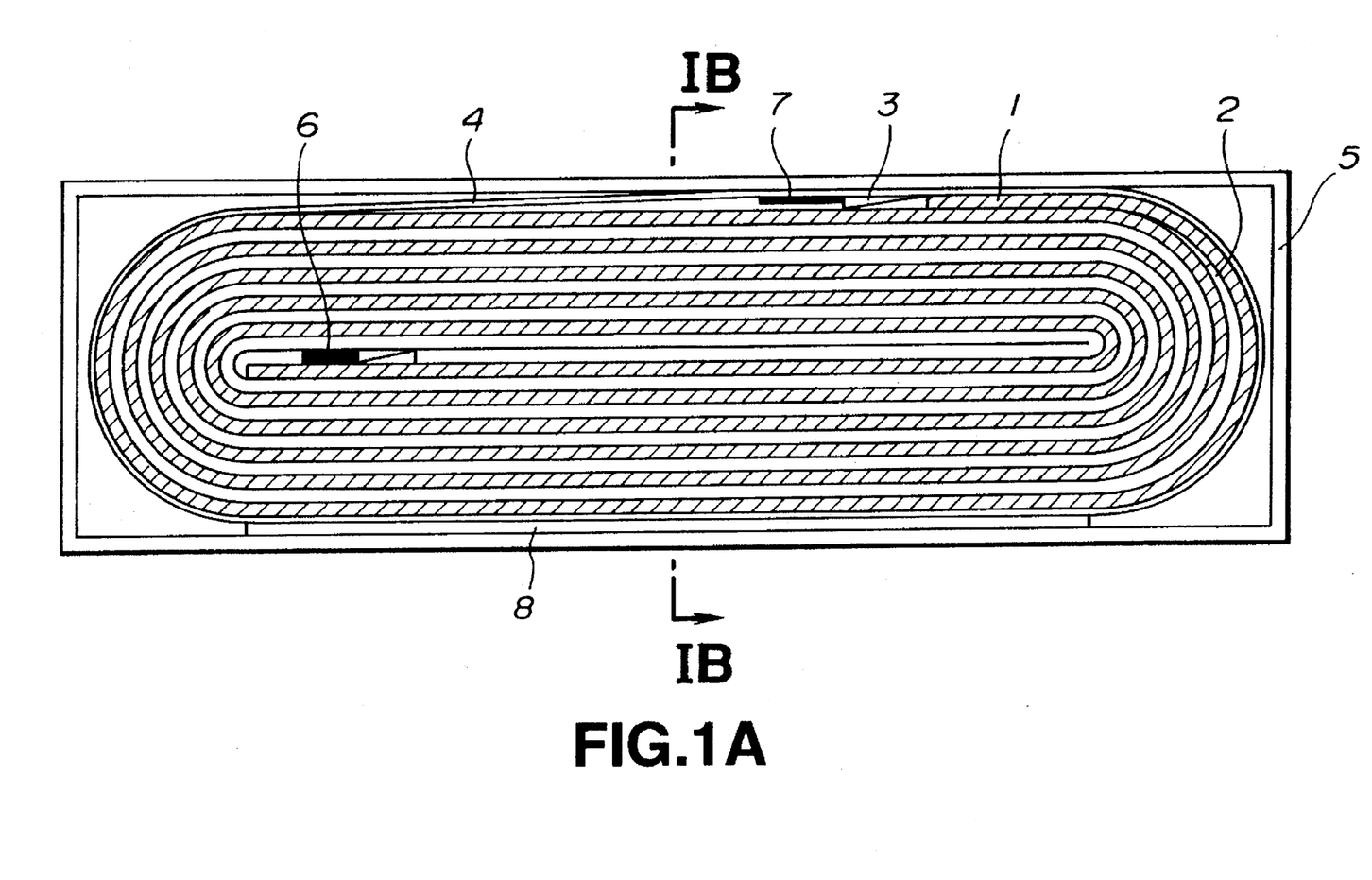
FIG. 1A is a cross-sectional view showing a cell according to one embodiment of the present invention and FIG. 1B is a vertical sectional view taken along the line IB—IB of FIG. 1B.
Figure 1B:
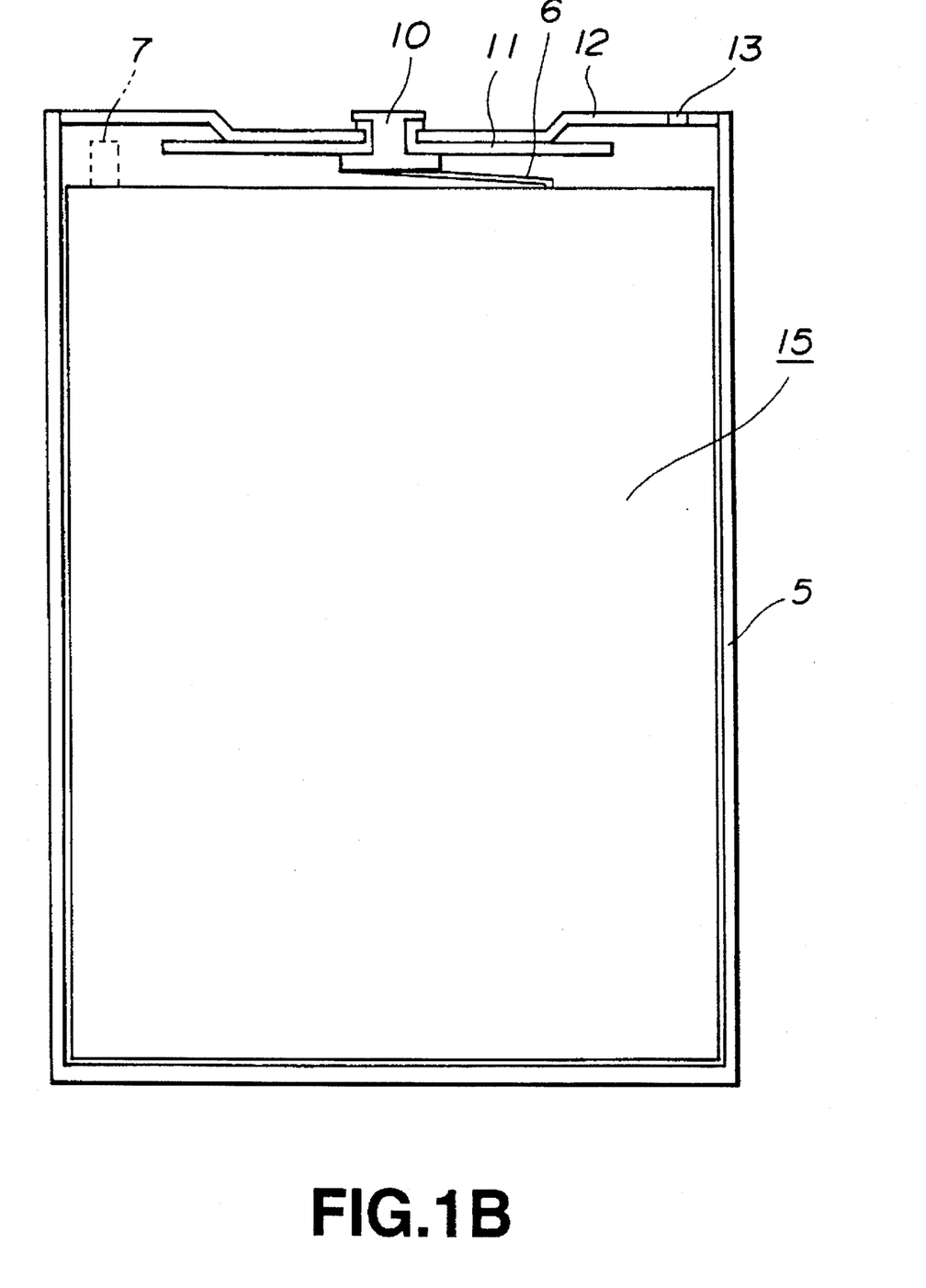

Referring now to FIGS. 1A and 1B, the the cell made in accordance with a method of the present invention includes a casing or housing 5 which is generally of a box-like shape and has a rectangular shape in section as shown in FIG. 1A. The casing or housing 5 is made of metal such as iron and accommodates therein a roll electrode element 15 and a plate spring 8. The plate spring 8 serves for holding the electrode element 15 in place in the casing or housing 5. The roll electrode element 15 is generally of a cylindrical shape as a whole and composed of a sheet-like negative electrode 1, a sheet-like positive electrode 2 and a plurality of separator films 3 at least one of which is interposed between the sheet-like negative and positive electrodes. Insulating members (not shown) are disposed on opposite ends of the roll electrode element 15. An open end of the casing or housing 5 is covered with a cell lid 12 to which a positive terminal 10 is mounted through an insulating plate 11. The positive terminal 10 is electrically connected to an aluminum lead 8. The aluminum lead 8, is derived from a positive current collector (not shown) which constitutes a part of the sheet-like positive electrode 2. Whereas, a nickel lead 7 is derived from a negative current collector (not shown) which constitutes a part of the sheet-like negative electrode 1. Incidentally, the fixing between the casing or housing 5 and the cell lid 12 may be made by welding such as a laser welding. The cell lid 12 is provided with a filling inlet 13 through which a liquid electrolyte is charged into an inside space of the casing or housing 5.

Figure 2:
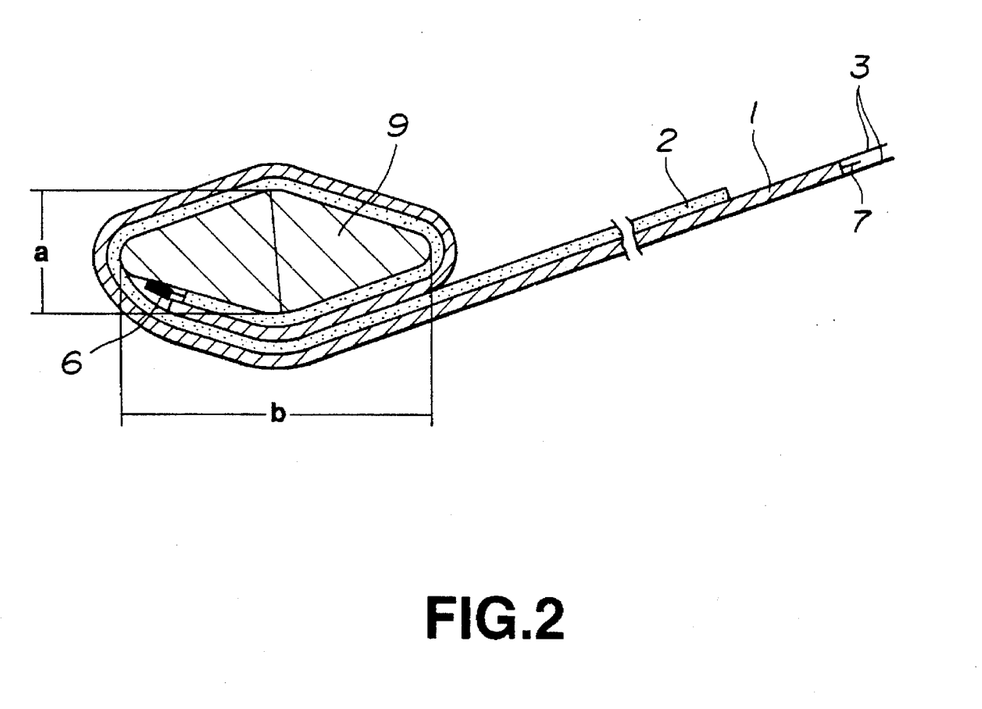
FIG. 2 is a view showing a condition in which an electrode laminate composed of positive and negative electrodes and film separators is wound around a core having an approximate rhombic shape in section, according to the present invention.

In the preparation of the electrode element 15, the sheet-like negative electrode 1 and the sheet-like positive electrode 2 are first alternately laminated or stacked together through a separator film 3 to form a electrode laminate, for example in the order of the first sheet-like negative electrode 1', the first separator film 3', the first sheet-like positive electrode 2' and the second separator film 3". The electrode laminate thus prepared is fixed on a core such that one of the separator films 3 is fixedly adhered to the core. The electrode laminate is wound around the core to form a roll of the electrode laminate 15 so that a multi-layered structure of negative and positive sheet electrodes are constituted. After removal of the core 9, the roll is compressed to form the roll electrode element 15. The core 9 may be made of a material having a sufficient mechanical strength. Examples of the suitable material of the core 9 include metal such as stainless steel or the like. The core 9 is of an approximately rhombic shape in section which has two diagonal lines which are not identical, namely a shorter diagonal line (a) and a long diagonal line (b) so that an acute angle portion is constituted at each of two opposite corners of the rhombic sectional shape. The acute angle corner portions serve for facilitating reforming of a folded portion of the electrode laminate when wound around the core 9. It is desired that an optimum ratio of the shorter diagonal line (a): the longer diagonal line (b) is appropriately determined by totally taking into consideration the reforming effect, the retention of its mechanical strength and a material used for the core. Incidentally, the acute angle corner portions may be chamfered or finished into a circular curved surface to prevent a damage to the roll electrode element 15 due to the contact therewith upon winding. In this case, the chamfering or the finishing of the acute angle corner portions of the core 9 may be performed to such a extent that the sectional shape of the core 9 still retain a substantially rhombic shape. The ratio of the shorter diagonal line (a) which connects opposite obtuse angle corner portions to the longer diagonal line (b) which connects the opposite acute angle corner portions, is determined in view of the mechanical strength of the core and the effect for preventing occurrence of looseness of the roll electrode element upon winding. The ratio (a):(b) of the shorter diagonal line (a) to the longer diagonal line (b) is suitably in the range of from 1:1.5 to 1:8, preferably from 1:2 to 1:5.

The core 9 having the approximately rhombic sectional shape can be applied to the production of various cells in which a roll or winding type electrode element having a ellipsoidal shape in section is used. For instance, the core 9 is considerably effective for the production of a non-aqueous electrolyte type secondary cell in many of which the roll or winding type electrode element is used to improve a heavy-load characteristics.

In the case of the non-aqueous electrolyte type secondary cell, the roll electrode element 15 may contain a negative active ingredient and a positive active ingredient.

Examples of the suitable negative active ingredient may include lithium, a lithium alloy or a material capable of dope or undope a lithium ion, for example a conductive polymer such as polyacetylene, a carbonaceous material such as coke and the like.

Examples of the suitable positive active ingredient may include a transition metal compound such as manganese dioxide and vanadium pentoxide, a transition metal chalcogen compound such as iron sulfide, a composite compound of any of these compounds with lithium, or the like.

The respective sheet-like negative and positive electrodes 1 and 2 may be prepared as follows. Each of the negative and positive active ingredients is mixed with a binder resin and, if desired, with a conductive material to form a raw mixture. The raw mixture is further dispersed in a dispersant to obtain a slurry mixture for the positive or negative electrode. The slurry mixture is then coated on a sheet-like current collector, followed by drying and compression-molding to obtain the sheet-like negative or positive electrode.

The thus prepared sheet-like negative and positive electrodes 1 and 2 are laminated or stacked alternately through the separator film 3 to form the electrode laminate. The electrode laminate is then wound around the core 9 and compressed into a roll to form a spiral-wound (roll) electrode element 15 having an ellipsoidal shape in section. If the winding of the electrode element 15 is performed by using the above-mentioned core having an approximately rhombic shape in section, the roll or winding type electrode element 15 for a non-aqueous electrolyte type secondary cell can be produced without looseness and dislocation of the respective electrodes upon winding.

The electrolyte usable for the non-aqueous electrolyte type secondary cell may be any of those generally known type and utilized in the art.

Examples of the suitable electrolyte may include $LiClO_4$, $LiAsF_6$, $LiPF_6$, $LiBF_4$, $LiB(C_6H_5)_4$, $LiCl$, $LiBr$, $CH_3SO_3Li$, $CF_3SO_3Li$ or the like. The electrolyte may be dissolved or dispersed in an organic solvent upon use.

Specific examples of the suitable organic solvent for the electrolyte may include polypropylene-carbonate, ethylene-carbonate, diethyl-carbonate, dimethyl-carbonate, methyl-ethyl-carbonate, 1, 2-dimethoxy-ethane, 1, 2-diethoxy-ethane, γ-butyl-lactone, tetrahydrofuran, 1, 3-dioxolan, 4-methyl-1, 3-dioxolan, diethyl-ether, sulfolan, methyl-sulfolan, acetonitrile, propiononitrile or the like. These compounds may be used singly or in the form of a mixture of two or more different compounds.

Examples:

The present invention is described in more detail by way of examples below. It is to be noted that an explanation of each example mentioned below is made by referring to the accompanying drawings.

Example 1:

In this example, the box-shaped cell as shown in FIGS. 1A and 1B was produced as follows.

First, the negative electrode 1 was prepared in the following manner.

An oxygen-containing functional group was introduced into a petroleum pitch as a starting material in an amount of 10 to 20% by weight based on a total amount thereof so that the petroleum pitch was subjected to a so-called oxygen-crosslinking reaction. The petroleum pitch was then calcined at a temperature of 1,000° C. in the presence of an inert gas stream so that a carbonaceous material exhibiting approximately a vitreous state was obtained. The thus obtained carbonaceous material was subjected to an X-ray diffraction measurement. The measurement revealed that a face distance with respect to the crystal face (002) was 3.78Å. The carbonaceous material was further measured by using a pycnometer method so that it was confirmed that a true specific gravity thereof was 1.58 gram per $cm^3$. The carbonaceous material was then pulverized to obtain a carbonaceous powder having an average particle size of 10 μm.

90 parts by weight of the thus obtained carbonaceous powder serving as a negative active ingredient was mixed with 10 parts by weight of polyvinylidene-fluoride as a binder resin to obtain a negative electrode preparation. The negative electrode preparation was dispersed in N-methyl-pyrrolidone as a solvent to form a slurry (or paste) of the negative electrode preparation.

The slurry of the negative electrode preparation was coated on both sides of a copper thin film having a thickness of 10 μm and serving as a negative current collector, and then subjected to drying and compression-molding to obtain a band-like negative electrode 1. Incidentally, the band-like negative electrode was formed, on each side of the copper thin film, with a coating layer of the dried slurry preparation having a thickness of 80 μm, and had a width of 41.5 mm and a length of 505 mm.

Next, the positive electrode 2 was prepared as follows.

0.5 mole of lithium carbonate was blended with 1 mole of cobalt carbonate. The mixture was calcined in air at a temperature of 900° C. for 5 hours, to obtain $LiCoO_2$ as a positive active ingredient.

91 parts by weight of the positive active ingredient ($LiCoO_2$) was blended with 8 parts by weight of graphite as a conductive material and 3 part by weight of polyvinylidene fluoride as a binder resin to obtain a positive electrode preparation. The positive electrode preparation was then dispersed in N-methyl-pyrrolidone to obtain a slurry (or paste) of the positive electrode preparation.

The positive electrode preparation slurry was uniformly coated on both sides of a band-like aluminum thin film having a thickness of 20 μm and serving as a positive current collector, and then subjected to drying and compression-molding to obtain a band-like positive electrode 2. Incidentally, the thus obtained band-like positive electrode 2 is formed on each side of the aluminum thin film with a coating layer having a thickness of 80 μm, and had a width of 39.5 mm and a length of 490 mm.

The band-like negative electrode 1, the band-like positive electrode 2 and separator films 3 were laminated or stacked alternately through in the order of the negative electrode, the inner separator film, the positive electrode and the outer separator film to form a electrode laminate. The separator film was made of fine porous polypropylene film and having a thickness of 30 μm and a width of 44.0 mm.

The electrode laminate thus formed was secured to a core 9 having an approximately rhombic shape in section as shown in FIG. 2 such that one of the separator films 3 was adhered to a surface of the core 9, and wound therearound many times to obtain a roll of the electrode laminate. In this case, the core had a ratio of the shorter diagonal line (a) to the longer diagonal line (b) of 1:2.5. Meanwhile, the core 9 was composed of two pieces which were separated along the shorter diagonal line (a). Further, the acute angle corner portion of each piece was finished into a circular curved surface.

After completely winding the electrode laminate around the core, the terminal end of the outermost separator film was fixed on an outer surface of the roll of the electrode laminate by using an adhesive tape 4 having a width of 40 mm as shown in FIG. 1A. Then, the core was removed from the roll of the electrode laminate. The roll of the electrode laminate was compressed in the diametrical direction thereof such that the roll was deformed into an ellipsoidal shape in cross-section to obtain the roll electrode element 15.

The thus obtained roll electrode element 15, as shown FIGS. 1A and 1B, was accommodated within the cell casing 5 made of iron together with a spring plate 8. After disposing insulating plates on upper and lower ends of the roll electrode element 15, an aluminum lead wire 8 was derived from the positive current collector and welded to a positive terminal 10 which was mounted to a cell lid 12 through an insulating plate 11 while a nickel lead wire 7 was derived from the negative current collector and welded to a wall portion of the casing 5. The cell lid 12 was welded to the casing 5 by using a laser welding. The electrolyte was prepared by dissolving one mole of $LiPF_6$ in one liter of solvent containing propylene carbonate and diethyl-carbonate in an identical amount each. The thus obtained electrolyte was introduced into an inside of the cell through a filling inlet 13 provided on the cell lid 12. The filling inlet 13 was then closed by welding so that the inside of the cell was hermetically sealed from the outside. Thus, a non-aqueous electrolyte type cell of a box-shape having a thickness of 8 mm, a width of 34 mm and a height of 48 mm was produced.

Figure 3:
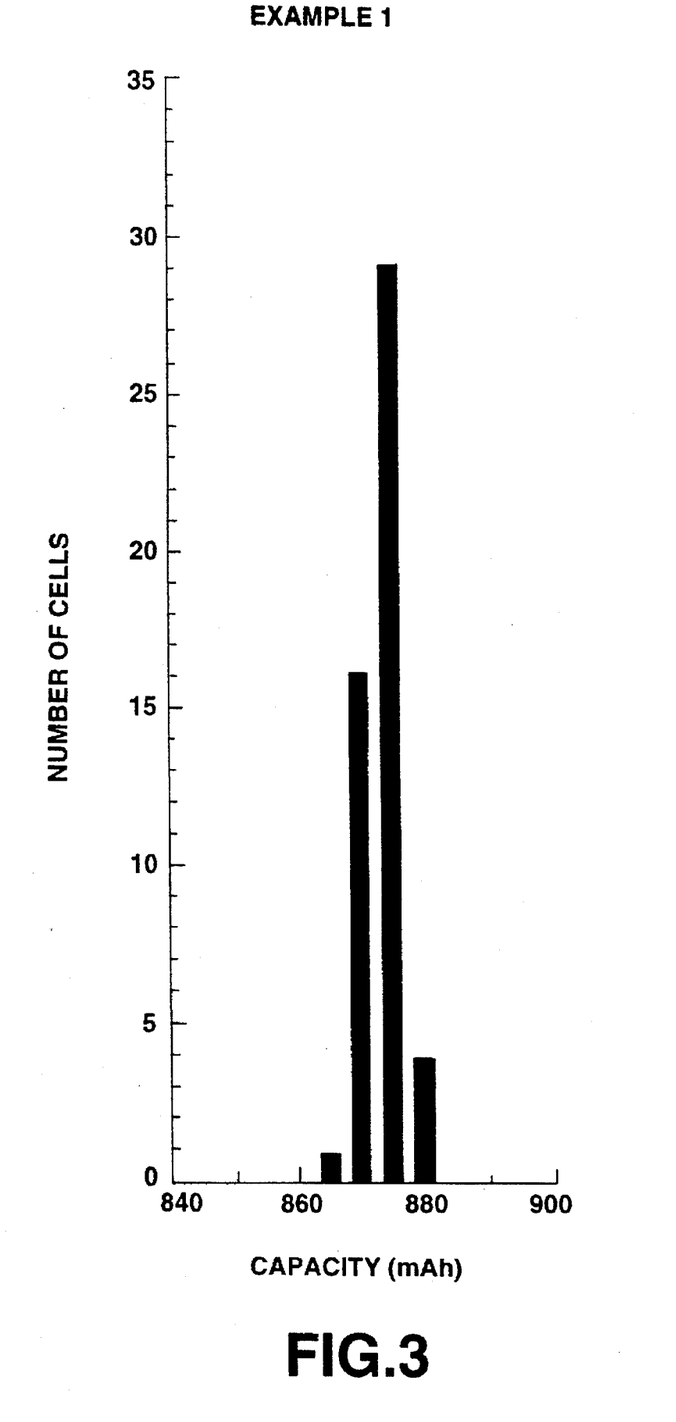
FIG. 3 is a graph showing a distribution of the discharge capacity of the cell in which a roll electrode element is produced by using the core which is of an approximately rhombic shape in section and has a ratio of a shorter diagonal line to a longer diagonal line of 1:2.5, as described in Example 1 according to the present invention.

50 non-aqueous electrolyte type cells thus produced were subjected to a constant-current charge which was carried out for 2.5 hours under the condition of 4.2 V of an upper limit voltage and a charge current of 0.7 A. Thereafter, the 50 cells were subjected to a constant-resistance discharge which was carried out under the condition of a load resistance of 7.5 Ω and an end voltage of 2.75 V. The above charging and discharging cycle was repeated ten times to determine a capacity of each of the cells. The results of the capacity distribution measurement obtained at 10th cycle of the charging and discharging cycles are shown in FIG. 3. Further, the 50 cells were observed with respect to occurrence of the winding dislocation of the roll electrode element. Concretely, the occurrence of the winding dislocation was determined by observing a degree of projection of the positive electrode from the negative electrode for each cell. The results of the observation are shown in Table 1.

Figure 4:
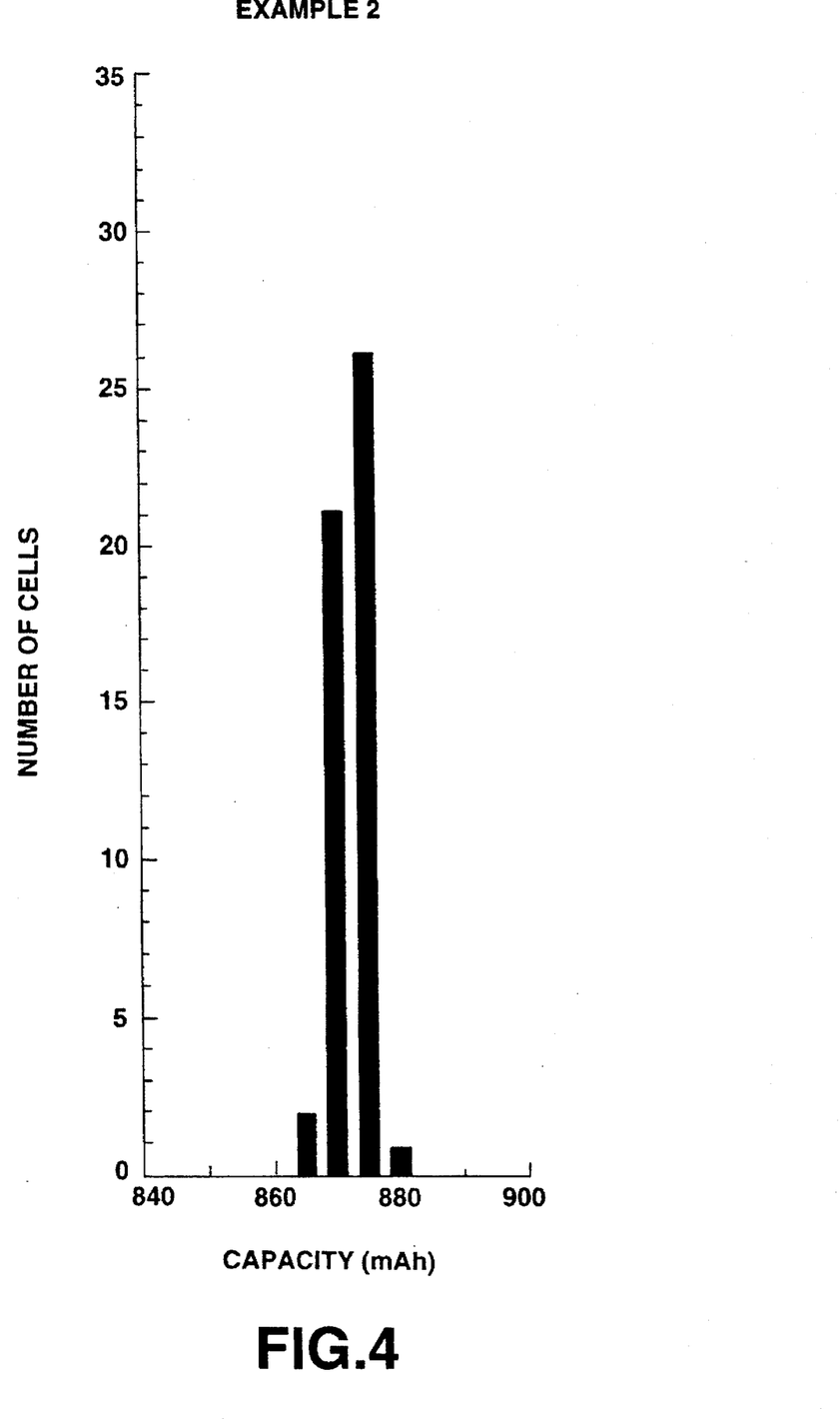
FIG. 4 is a graph showing a distribution of the discharge capacity of the cell in which a roll electrode element is produced by using the core which is of an approximately rhombic shape in section and has a ratio of a shorter diagonal line to a longer diagonal line of 1:1.5, as described in Example 2 according to the present invention.

Example 2:

The procedure of Example 1 was repeated in the same manner as described above except that the core of an approximately rhombic shape in section had the ratio (a):(b) of 1:1.5 and the core had a structure divided into two pieces along the shorter diagonal line (a), so that 50 non-aqueous electrolyte type cells of a box-shape were produced. The 50 cells were subjected to the 10 charge and discharge cycles in the same manner as in Example 1. The results of the capacity distribution measurement obtained at the 10th cycle were shown in FIG. 4. Further, the 50 cells were observed with respect to occurrence of the winding dislocation of the roll electrode element. Specifically, the occurrence of the winding dislocation was determined by observing a degree of projection of the positive electrode from the negative electrode for each cell. The results of the observation are also shown in Table 1.

Figure 5:
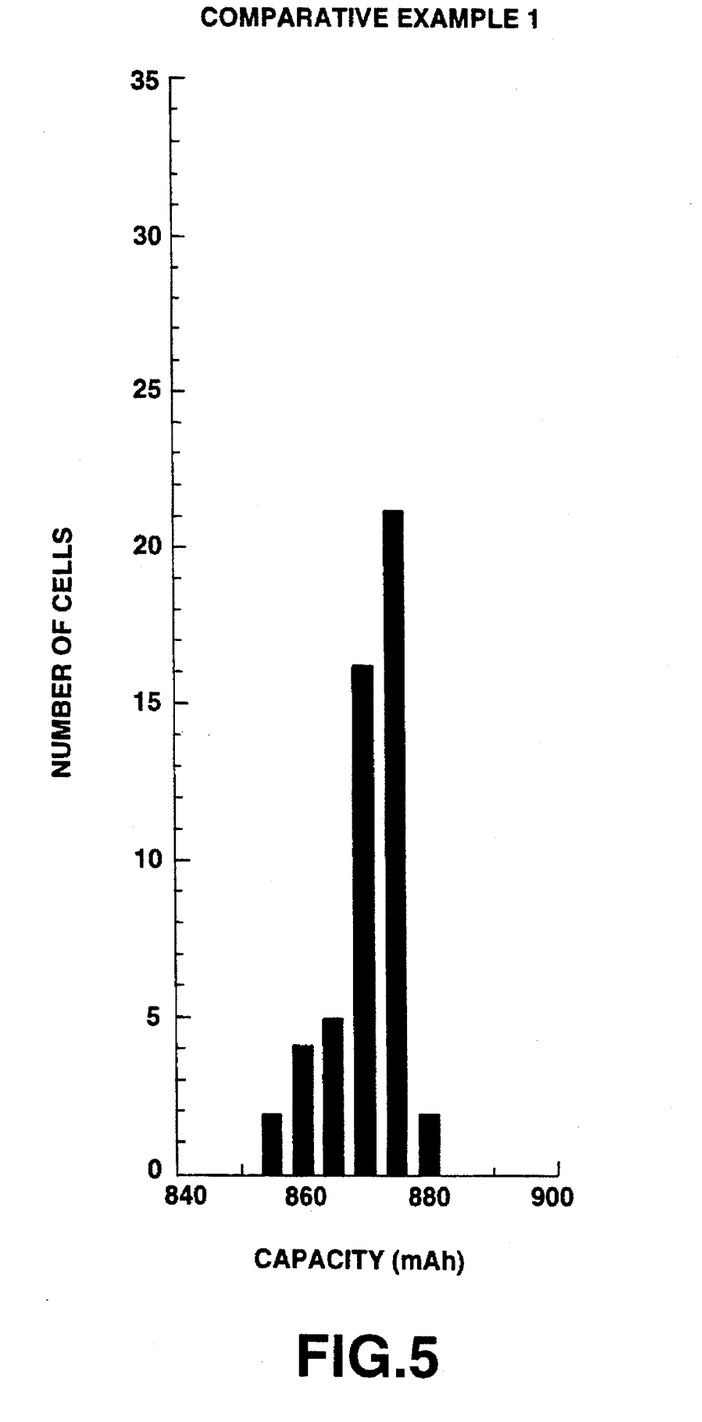
FIG. 5 is a graph showing a distribution of the discharge capacity of the cell in which a roll electrode element is produced by using the core which is of a circular shape in section, as described in Comparative Example 1.

Comparative Example 1:

The procedure of Example 1 was repeated in the same manner as described above except that the core of a circular shape in section was used instead of that having an approximately rhombic shape in section, and the core had a structure divided into two pieces along a diameter, so that 50 non-aqueous electrolyte type cells of a box-shape were produced. The 50 cells were subjected to the 10 charge and discharge cycles in the same manner as in Example 1. The results of the capacity distribution measurement obtained at the 10th cycle were shown in FIG. 5.

Figure 6:
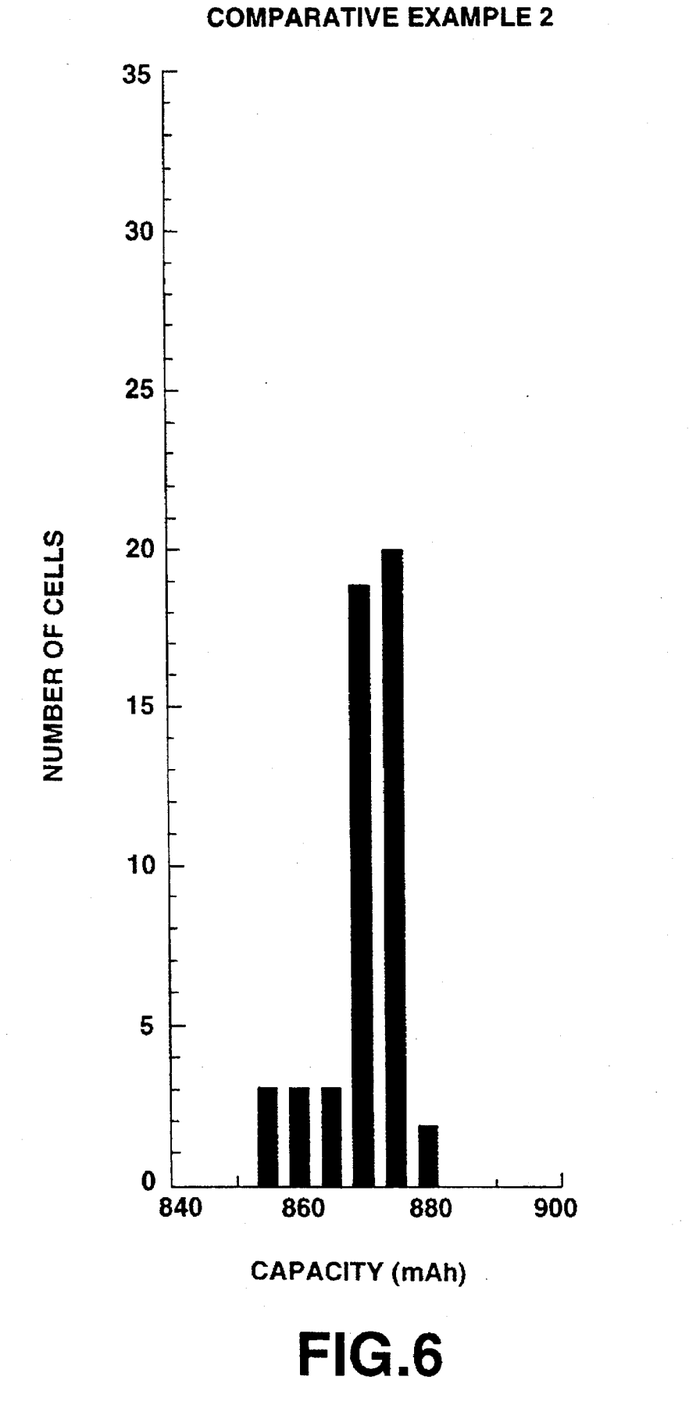
FIG. 6 is a graph showing a distribution of the discharge capacity of the cell in which a roll electrode element is produced by using the core which is of an ellipsoidal shape in section, as described in Comparative Example 2.

Comparative Example 2:

The procedure of Example 1 was repeated in the same manner as described above except that the core of an ellipsoidal shape in section was used instead of that having an approximately rhombic shape in section, and the core had a structure divided into two pieces along a minor axis thereof, so that 50 non-aqueous electrolyte type cells of a box-shape were produced. The 50 cells were subjected to the 10 charge and discharge cycles in the same manner as in Example 1. The results of the capacity distribution measurement obtained at the 10th cycle were shown in FIG. 6.

Figure 7:
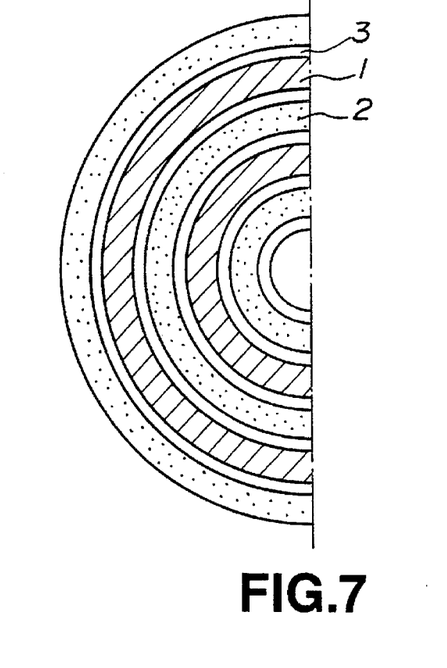
FIG. 7 is a fragmentary sectional view showing an roll electrode element produced without winding looseness, according to the present invention.

As is apparent from FIGS. 3 to 8, the cells of Examples 1 and 2, which were produced by using the core having an approximately rhombic shape in section, show a discharge capacity ranging from 870 mAh to 875 mAh and therefore the discharge capacity is fluctuated only within an extremely small range. This is because the roll electrode elements of Examples 1 and 2 were produced without looseness of the folded corner portions as shown in FIG. 7. It is considered that the extremely small fluctuation of the discharge capacity, which occurred with respect to the roll electrode elements of Examples 1 and 2, is caused merely due to the difference in an amount of the active ingredient charged into the respective cells. Therefore, no severe problem is indicated by the extremely small fluctuation of the discharge capacity.

Figure 8:
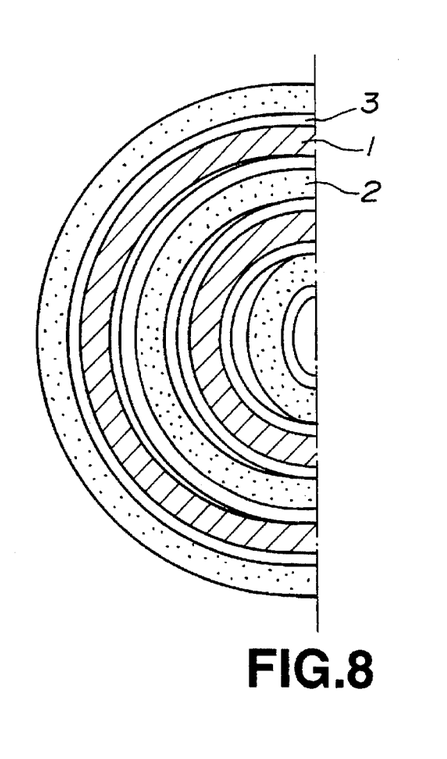
FIG. 8 is a fragmentary sectional view showing an roll electrode element suffering from winding looseness.

On the other hand, with respect to the cells of Comparative Examples 1 and 2 in which the core having a sectional shape other than the approximately rhombic shape was used, the discharge capacity distribution is fluctuated to a large extent, particularly much fluctuation of the distribution of the discharge capacity is observed in a lower side range thereof. This is due to the fact that a clearance between the positive and negative electrodes was caused by looseness of the roll electrode element upon winding, as shown in FIG. 8, so that a normal interelectrode reaction could be no longer performed.

From the above results, it is apparently appreciated that the use of the core having an approximately rhombic shape in section effectively prevents the occurrence of the looseness of the roll electrode element upon winding and the fluctuation of the discharge capacity due to the looseness of the roll electrode element.

Comparative Example 3:

The procedure of Example 1 was repeated in the same manner as described above except that the core of a flat-plate shape was used instead of that having an approximately rhombic shape in section, and the core had a structure divided into two pieces along the direction of a shorter side thereof, so that 50 non-aqueous electrolyte type cells of a box-shape were produced. The 50 cells were observed with respect to occurrence of the winding dislocation of the roll electrode element. Specifically, the occurrence of the winding dislocation was determined by observing a degree of projection of the positive electrode from the negative electrode for each cell. The results of the observation are also shown in Table 1.

TABLE 1

| Example No. | Number of occurrence of winding dislocation | Percentage of occurrence of winding dislocation |
|---|---|---|
| Example 1 | 0/50 | 0 % |
| Example 2 | 0/50 | 0 % |
| Comparative Example 3 | 3/50 | 6 % |

As is apparent from Table 1, any of the 50 electrode elements prepared in each of Examples 1 and 2, in which the core having an approximately rhombic shape in section was used, showed no winding dislocation. On the other hand, it is noted that three of the 50 electrode elements prepared in Comparative Example 3, in which the core having a flat-plate shape was used, showed the winding dislocation. The winding dislocation of the roll electrode element of Comparative Example 3 was caused due to the deflection occurring when the electrode laminate was wound around the core.

From the above results, it is confirmed that the use of the core having an approximately rhombic shape in section effectively prevents the occurrence of the looseness of the roll electrode element and the fluctuation or deterioration of the discharge capacity.

Example 3 and Comparative Examples 4 and 5:

The procedure of Example 1 was repeated in the same manner as described above except that the cores having the ratios (a):(b) of 1:8 (Example 3), 1:10 (Comparative Example 4) and 1:1.2 (comparative Example 5) were used, so that 50 roll electrode elements for a non-aqueous electrolyte type cell of a box-shape were produced in each of Example 3 and Comparative Examples 4 and 5. The 50 roll electrode elements were observed with respect to the occurrence of the winding dislocation. Specifically, the occurrence of the winding dislocation was determined by observing a degree of projection of the positive electrode from the negative electrode. As a result, it was confirmed that no winding dislocation was caused in any of the roll electrode elements of Example 3. On the other hand, 2% of the 50 roll electrode elements caused the winding dislocation in case that the ratio (a):(b) was 1:10 (Comparative Example 4), and the discharge capacity was fluctuated in the wide range between 880 mAh and 880 mAh in case that the ratio (a):(b) was 1:1.2 (Comparative Example 5).

From the above results, it is apparently appreciated that the limited fluctuation of the discharge capacity and the prevention of the winding dislocation can be achieved when the ratio (a):(b) of the shorter diagonal line (a) to the longer diagonal line (b) of the core is fallen within the range between 1:1.5 to 1:8.

What is claimed is:

1. A method for making a cell, the method comprising:

providing an electrode laminate including at least one sheet-like positive electrode, at least one sheet-like negative electrode and at least one separator film which are arranged alternately in an overlapped relation to each other such that the sheet-like positive electrode is brought into contact with the sheet-like negative electrode through the separator film;

winding said electrode laminate around a core which has a approximately rhombic sectional shape to form a roll having a multi-layered structure;

removing said core; and compressing said roll to so that said roll electrode element has a an ellipsoidal sectional shape.

2. A method as defined in claim 1, further comprising the step of:

placing said roll in a casing.

3. A method as defined in claim 2, further comprising the step of:

filling said casing with an electrolyte.

4. A method as defined in claim 2, further comprising the step of:

filling said casing with a non-aqueous electrolyte.

* * * * *